United States Patent [19]

Lu

[11] Patent Number: 4,766,023
[45] Date of Patent: Aug. 23, 1988

[54] METHOD FOR MAKING A FLEXIBLE LOUVERED PLASTIC FILM WITH PROTECTIVE COATINGS AND FILM PRODUCED THEREBY

[75] Inventor: Shih-Lai Lu, St. Paul, Minn.

[73] Assignee: Minnesota Mining and Manufacturing Company, St. Paul, Minn.

[21] Appl. No.: 3,723

[22] Filed: Jan. 16, 1987

[51] Int. Cl.⁴ .................................................. B05D 3/06
[52] U.S. Cl. .................................. 420/120; 427/54.1; 156/272.2
[58] Field of Search ............................. 427/44, 54.1; 156/272.2, 272.3; 428/120

[56] References Cited

U.S. PATENT DOCUMENTS

| Re. 27,617 | 4/1973 | Olsen | 161/6 |
|---|---|---|---|
| 2,436,144 | 2/1948 | Howk et al. | 526/229 |
| 3,220,960 | 11/1965 | Wichterle | 260/2.5 |
| 3,361,858 | 1/1968 | Wichterle | 264/1 |
| 3,653,138 | 4/1972 | Cooper | 40/130 R |
| 3,707,416 | 12/1972 | Stevens | 156/196 |
| 3,791,722 | 2/1974 | Ahlberg et al. | 351/45 |
| 3,919,559 | 11/1975 | Stevens | 250/508 |
| 3,922,440 | 11/1975 | Wegwerth et al. | 428/437 |
| 3,929,545 | 12/1975 | Van Dyck et al. | 156/220 |
| 4,181,752 | 1/1980 | Martens et al. | 427/54.1 |
| 4,218,279 | 8/1980 | Green | 156/272 |
| 4,268,337 | 5/1981 | Ibata et al. | 156/244.17 |
| 4,415,615 | 11/1983 | Esmay et al. | 428/40 |

FOREIGN PATENT DOCUMENTS

| 53/91995 | 8/1978 | Japan . |
| 53/103092 | 9/1978 | Japan . |
| 1576911 | 10/1980 | United Kingdom . |
| 2148792A | 6/1985 | United Kingdom . |

OTHER PUBLICATIONS

Harris et al., J. Polymer Sci., A-1, 4, 665-677, (1966).
Haas, et al., J. Polymer Sci., 22, 291, (1956).
L. A. Vol'f et al., Khim Volokna, 2, 14, (1979).
J. Chernikov et al., Nauchn Tr., Kuban Gos. Univ., 243, 141, (1977).

Primary Examiner—John H. Newsome
Attorney, Agent, or Firm—Donald M. Sell; Stephen W. Buckingham

[57] ABSTRACT

Louvered plastic film can be more easily handled and installed by coating at least one surface with a solvent-free monomer composition and exposing the coating to ultraviolet radiation to polymerize the composition.

25 Claims, 1 Drawing Sheet

METHOD FOR MAKING A FLEXIBLE LOUVERED PLASTIC FILM WITH PROTECTIVE COATINGS AND FILM PRODUCED THEREBY

The present invention relates to louvered plastic film and more particularly to such a film which has increased flexibility.

BACKGROUND OF THE INVENTION

U.S. Pat. No. Re. 27,617 (Olsen) teaches a process of making a louvered light control film by skiving a billet of alternating layers of plastic having relatively lower and relatively higher optical densities. Upon skiving the billet, the pigmented layers provide light collimating louver elements, which, as illustrated in the patent, may extend orthogonally to the resulting louvered plastic film. U.S. Pat. No. 3,707,416 (Stevens) teaches a process whereby light collimating louver elements may be canted with respect to the surface of the louvered plastic film to provide a film which collimates light in a direction other than perpendicular to the surface of the film. U.S. Pat. No. 3,919,559 (Stevens) teaches a process for attaining a gradual change in the angle of cant of successive light collimating louver elements.

Among the uses for such louvered plastic films are lenses and goggles as shown in U.S. Pat. No. 3,791,722 (Ahlberg et al), to be worn where high levels of illumination or glare are encountered. The film may also be used for a transparent covering for a backlighted instrument panel, such as the instrument panel of an automobile, to minimize reflections from being cast onto the windshield. A louvered plastic film may also be used to give a black and white photographic negative the appearance of a positive made from the negative, as taught in U.S. Pat. No. 3,653,138 (Cooper).

U.S. Pat. No. 3,922,440 (Wegwerth et al) points out that because louvered plastic films "are thin sheet materials: (1) they are not by themselves capable of structurally withstanding extreme stresses and (2) they are subject to distortion from physical stress and temperatures" (col. 1, lines 19–22). Furthermore, the skiving by which the louvered plastic films are produced results in irregular surfaces which seriously limits the optical quality of the film. Typically such films are, for practical purposes, opaque. Accordingly, as in Example 1 of that patent, the louvered plastic film usually is laminated under pressure between two clear plastic films of a material such as cellulose acetate butyrate, the material usually used in making louvered plastic films. Typically, the louvered plastic film is skived from the billet to a thickness between 0.2 and 0.4 mm, each of the outer plastic films has a thickness of between 0.15 and 0.3 mm. The thickness of the skived film will control the permitted view angle, with a thicker film providing a narrower angle. Wegwerth's process of laminating louvered plastic films between two clear films requires an expensive press which is also expensive to operate. This is in part from the need to distribute heat uniformly and in part from the need to apply pressure with precision. Because the resulting laminates can not be larger than the platens of the press in which they are laminated, the press must be sufficiently large to produce the required size thus increasing the expense of the press.

Commonly assigned copending application Ser. No. 908,990 teaches an alternative to the Wegwerth method. The alternative method includes the steps of (1) coating the skived louvered plastic film with a solventless monomer composition which polymerizes to an adhesive state upon exposure to ultraviolet radiation, (2) overlaying the monomer composition with a plastic film, and (3) exposing the coating to ultraviolet radiation to polymerize the composition to an adhesive state. After polymerization the plastic liner which was placed over the monomer composition may be left in place to serve as protection for the louvered plastic film, or may be removed, leaving the polymerized composition exposed to act as a pressure-sensitive adhesive for bonding the film to other materials.

The alternative method is advantageous over the Wegwerth method in that it can be used in a continuous process rather than only in a batch process as is the case with the Wegwerth method. Furthermore, the alternative method does not require the expensive press and the precise application of heat and pressure which the Wegwerth method requires. The alternative method is disadvantageous, however, because the monomer compositions which polymerize to an adhesive state polymerize slowly. Thus, for use in a continuous process, either a very long radiation chamber is required or the film must move through the radiation chamber very slowly. In either case the expense of producing the film is again increased. A disadvantage which is common to the alternative method and the Wegwerth method lies in the fact that the protective liners and skived louvered plastic film produce a laminate which is relatively stiff. In some applications, such as when the louvered plastic film is to cover a touch sensitive display screen, a more flexible film is desirable.

SUMMARY OF THE INVENTION

The present invention relates to a simplified method of producing a louvered plastic film with a protective coating and the film produced by that method. The method of the invention may be used in a substantially continuous process, thereby further reducing production expenses and allowing desired sizes to be cut from the continuous sheet, reducing waste.

In the method of the invention a louvered plastic film is coated with a solventless composition comprising a mixture of an oligomer, a monomer, and a photo-initiator which composition polymerizes to a, preferably clear, hard layer upon exposure to an appropriate type of radiation. A plastic film is placed over the monomer composition and the monomer composition is then irradiated with the polymerizing radiation. Finally the plastic liner is removed leaving a hard but flexible polymer coating to protect the louvered plastic film.

The present invention is advantageous because the liner films which are removed may be of a less expensive material than those which are used as protective layers in the Wegwerth method or the alternative method described above. Furthermore, the available monomers which cure to a hard state may be cured much more rapidly than those which cure to an adhesive state. Thus, less expensive machinery may be used for the curing process. Another advantage lies in the fact that less stringent controls are required on the amount of irradiation used to cure a polymer to a hard state than those which are required to cure a polymer to an adhesive state. This is because too high of a dose, or too intense of an exposure during the curing process, may adversely affect the adhesive qualities of an adhesive polymer, while such errors have little effect on the properties of the hard polymer. A further advantage lies in the fact that the removal of the plastic films allows the resulting louvered plastic film with its protective layers to be more flexible.

DETAILED DESCRIPTION OF A PREFERRED EMBODIMENT

Figure 1:
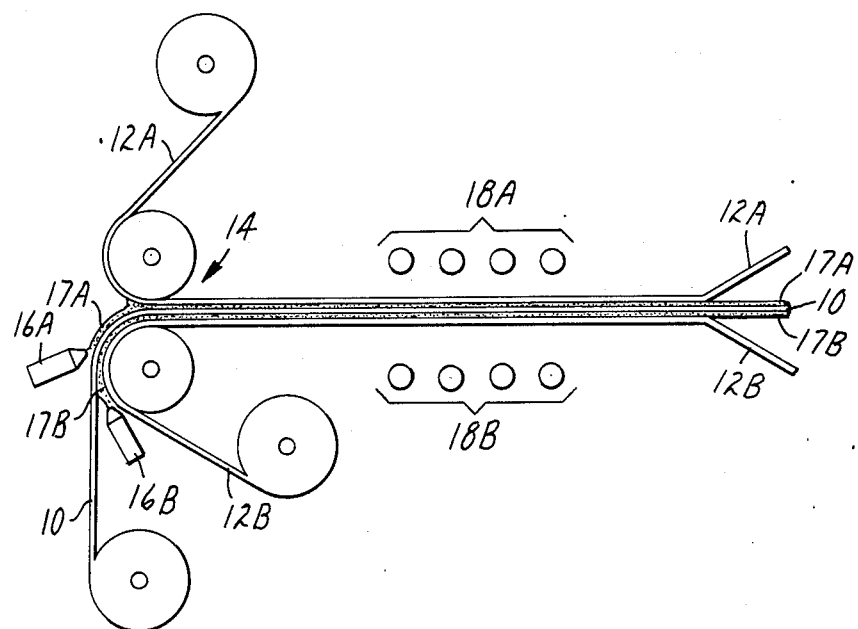
FIG. 1 is a schematic drawing of apparatus performing the process of the invention.

FIG. 1 shows apparatus which may be used with the method of the invention. A louvered plastic film 10 and plastic films 12A and 12B are fed into two roll coater 14. Applicators 16A and 16B apply layers of a radiation curable composition 17A and 17B containing an oligomer, a monomer, and a photo-initiator to louvered plastic film 10. Preferably the oligomer component of composition 17A and 17B will thicken the composition sufficiently to form a syrup. Plastic sheets 12A and 12B cover radiation curable composition layers 17A and 17B. Clearly plastic sheets 12A and 12B must be transmissive to the type of radiation which will be used to polymerize layers 17A and 17B.

Radiation curable layers 17A and 17B may be of any desired thickness although generally thin layers are preferred. This is because thin layers (1) require less of the radiation curable composition and are thus less expensive; (2) provide greater flexibility in the resulting film; and (3) absorb less optical energy thereby resulting in a film which transmits more of the light incident on it. The thickness desired for radiation curable composition layers 17A and 17B will be determined by a variety of factors. Clearly a film which is to be used in an application where it will receive relatively greater stress will require thicker layers while an application requiring greater flexibility or optical transmissivity will dictate thinner layers. The degree of surface irregularity in the skived film will also affect the required thickness of radiation curable composition layers 17A and 17B. Generally thicker skived film have greater surface irregularities than do thin ones and thus require thicker layers to correct these irregularities. In test layers with a thickness of 0.001 inches have performed well. The thickness could be reduced to 0.0005 inches without serious consequences and, for some uses, be reduced to as thin as 0.002 or even 0.0001 inches. Alternatively layers as thick as about 0.002 inches could be used.

After passing through roll coater 14, louvered plastic film 10, radiation curable composition layers 17A and 17B, and plastic films 12A and 12B are exposed to radiation emanating from radiation sources 18A and 18B. In the preferred embodiment the radiation curable composition is curable by exposure to ultraviolet light and hence radiation sources 18A and 18B would be sources of ultraviolet light. Alternatively, the radiation curable composition could be curable by exposure to other types of radiation such as other frequencies of electromagnetic radiation or an electron beam. If the composition chosen is curable by exposure to such other types of radiation then radiation sources 18A and 18B should be sources of the appropriate type of radiation.

After radiation curable composition layers 17A and 17B have been cured to a hard state by exposure to radiation from radiation sources 18A and 18B, plastic layers 12A and 12B are removed. The resulting film, consisting of louvered plastic film 10 and the cured layers 17A and 17B may then be formed into a continuous roll or may be cut into sheets of desired length and stacked. The latter method is preferred because experience has shown that more damage in the form of scratches in the protective coating occurs when the film is formed into a roll than when it is stacked. Furthermore if such film is stored in a roll more effort is required to flatten it for use in an application where it must lie flat.

In an alternative embodiment, plastic films 12A and 12B need not be removed at the time of manufacture. They may be left in place on the film until such time as the film is to be used. This method is advantageous because plastic sheets 12A and 12B help to protect hardened layers 17A and 17B from physical damage.

Figure 2:
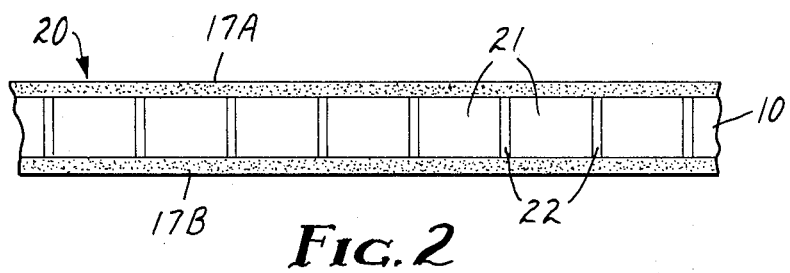
FIG. 2 is a schematic drawing of a cross section of the film of the invention.

FIG. 2 shows the completed film 20. Film 20 includes louvered plastic film 10, which has alternating clear regions such as region 21 and opaque regions such as region 22. Cured hard layers 17A and 17B provide protection and support for louvered plastic film 10 on each side.

Care must be taken in selecting the materials to be used in the radiation curable compositions as well as the plastic liner sheets. The radiation curable composition must cure to an optically transparent and hard, i.e., preferably flexible, dry, tack free state upon exposure to a selected type of radiation, such as ultraviolet light. Furthermore it must bond tightly to the louvered plastic film upon curing, but must release easily from the liner sheet. In addition, it must not develop cracks or bubbles during the curing process. Another requirement is that upon curing its surface must conform well to the surface of the liner sheet.

The last requirement mentioned above leads to another advantage of the present invention. For most applications an optically smooth surface will be desired for the film 20. In order to produce such a surface an optically smooth plastic liner film is utilized. In some circumstances, however, a matte finish is preferred. When a matte finish is desired, the plastic liner is provided with a matte finish. The resulting layers 17A and 17B will harden to a mirror image of the liner surface. Thus, a matte finish or other structured finish, may be produced with no further processing by choosing a liner sheet which has a mirror image or negative of the finish desired.

One radiation curable composition which has proved suitable for use in the present invention is a combination of epoxy-silane prepolymer, oxydiethanol and triaryl sulfonium hexafluoro antimonate, the latter functioning as a photoinitiator. A commercially available radiation curable composition which has proven effective for use with the invention is sold under the trade name of GAF-GARG 245 by GAF Corporation of New York, NY. Another composition which has been shown to work is sold under the trade name of UV 3333 by Mitsubishi Plastics Ind. Ltd. of Tokyo, Japan.

Materials which have proven effective as liner sheets include polyester, polyvinyl chloride, polypropylene and polyethylene. Of these materials, polyester is preferred because it has fewer surface defects and thus the resulting polymer layer will have a better optical surface.

EXAMPLE

To test the film of the invention a mixture of 50 parts epoxy-silane prepolymer, 7.5 parts oxydiethanol, and 1 part triaryl sulfonium hexafluoro antimonate was prepared. The epoxy-silane prepolymer thickened the composition to create a syrup for coating. This syrup was coated on a 0.013 inch thick louvered plastic film producing a 0.001 inch thick layer on each side. A 0.002 inch thick sheet of polyethylene terephthalate (PET) was laid over each layer of the syrup. The syrup was cured in a UVEXS MODEL 750, manufactured by UVEXS, Inc. of Sunnyvale Calif., having an enhanced spectral range of 350 to 380 nm. The composite was advanced through the curing unit at a rate of 18 feet per minute. After three passes on each side, the protective polymer films were found to be fully cured to a hard state.

Composite films produced in this experiment were tested for resistance to staining and attack by solvents. In the test each staining agent or solvent was applied to a sample of the film. The test sample was covered to prevent air circulation during the test and was allowed to stand for 24 hours. The cover was then removed and the sample was cleaned with a dry or damp tissue, as required. The sample was then visually evaluated to determine any degradation in optical properties which had occurred. The following substances were used in this test: 5% acetic acid, unleaded gasoline, motor oil, lipstick, a carbonated cola soft drink, coffee, liquid detergent, rubber cement, a commercial window cleaner, methanol, ethanol, acetone, chloroform, toluene, methy ethyl ketone, and isopropyl alcohol. Some surface staining was observed in the test with lipstick. Chloroform was observed to partially dissolve the new protective coating. In both cases, the damage was within acceptable limits. No damage was observed in any of the other tests.

A separate sample produced in this experiment was tested for resistance to abrasion. In this test, a sample of the film is placed at a 45° angle approximately 2 inches beneath a vertical tube which is one meter long. One liter of 20 to 30 mesh sand was dropped through the tube onto the film. The sample was then cleaned and tested with a haze meter. The test resulted in an increase in haze due to the abrasion of 14%. A comparable sample produced by the Wegwerth et al. method of heat laminating resulted in a 60% increase in haze due to abrasion.

I claim:

1. A method of producing a composite structure including a louvered plastic film, said method comprising the steps of:
   coating a first major surface of a louvered plastic film with a composition in a fluid state which polymerizes to a transparent hard state upon exposure to a selected type of radiation, said composition bonding strongly to said louvered plastic film upon polymerization;
   bringing a first liner film which is transmissive to said selected type of radiation into contact with said coating of composition, said liner film being selected to release easily from said composition after polymerization of said composition; and
   exposing said composite to sufficient radiation of said selected type to polymerize said composition to a hard state.

2. The method of claim 1 wherein the selected type of radiation is ultra-violet light.

3. The method of claim 1 further comprising the step of removing said liner film.

4. The method of claim 1 wherein the surface of said liner film which contacts said composition is optically smooth.

5. The method of claim 4 wherein the selected type of radiation is ultra-violet light.

6. The method of claim 5 further comprising the step of removing said liner film.

7. The method of claim 1 wherein the surface of said liner film which contacts said composition is so as to produce a matte finish on said composition when said composition is polymerized.

8. The method of claim 7 wherein the selected type of radiation is ultra-violet light.

9. The method of claim 8 further comprising the step of removing said liner film.

10. The method of claim 1 further comprising the steps of:
    coating a second major surface of said louvered plastic film with said composition;
    bringing a second liner film which is transparent to said selected type of radiation into contact with said second coating of said composition; and
    exposing said composite to sufficient radiation of said selected type to polymerize said second coating of said composition to a hard state.

11. The method of claim 10 wherein the selected type of radiation is ultra-violet light.

12. The method of claim 10 further comprising the step of removing both of said liner films.

13. The method of claim 10 wherein the surfaces of both of said liner films which contact said solvent-free composition are optically smooth.

14. The method of claim 13 wherein the selected type of radiation is ultra-violet light.

15. The method of claim 14 further comprising the step of removing both of said liner films.

16. A composite louvered plastic film product comprising
    a louvered plastic film having first and second major surfaces; and
    a first layer of hard radiation polymerized, optically clear composition adhered to said first major surface.

17. The composite of claim 16 wherein said first layer of polymerized composition has an optically smooth surface.

18. The composite of claim 16 wherein said first layer of polymerized composition has a surface with a matte finish.

19. The composite of claim 16 wherein said first layer of polymerized composition has a thickness in the range of 0.0001 inches to 0.002 inches.

20. The composite of claim 19 wherein said first layer of polymerized composition has a thickness in the range of 0.0005 inches to 0.002 inches.

21. The composite of claim 16 further comprising a second layer of hard, radiation polymerized, optically clear composition adhered to said second major surface.

22. The composite of claim 21 wherein each of said layers of polymerized composition has an optically smooth surface.

23. The composite of claim 21 wherein said first layer of polymerized composition has a surface with a matte finish.

24. The composite of claim 21 wherein each of said layers of polymerized composition has a thickness in the range of 0.0001 inches to 0.002 inches.

25. The composite of claim 24 wherein each of said layers of polymerized composition has a thickness in the range of 0.0005 inches and 0.002 inches.

* * * * *